United States Patent [19]
Matsuura

[11] Patent Number: 6,023,581
[45] Date of Patent: Feb. 8, 2000

[54] PROGRAM DEBUGGING SUPPORT DEVICE

[75] Inventor: Satoshi Matsuura, Tokyo, Japan

[73] Assignee: Ando Electric Co., Ltd., Tokyo, Japan

[21] Appl. No.: 08/954,659

[22] Filed: Oct. 20, 1997

[30] Foreign Application Priority Data

Oct. 24, 1996 [JP] Japan .................................. 8-282585

[51] Int. Cl.⁷ .................................................. G06F 11/30
[52] U.S. Cl. ........................... 395/704; 714/39; 714/43; 714/47; 714/25; 709/224; 709/232; 709/203; 370/241; 370/245
[58] Field of Search ............................... 395/704, 183.15, 395/183.19, 183.14, 184.01; 714/39, 43, 38, 47, 25, 26, 712; 709/224, 203, 232; 370/241, 245, 252, 254

[56] References Cited

U.S. PATENT DOCUMENTS

| | | | |
|---|---|---|---|
| 5,375,159 | 12/1994 | Williams | 379/23 |
| 5,430,709 | 7/1995 | Galloway | 370/241 |
| 5,546,540 | 8/1996 | White | 709/223 |
| 5,572,533 | 11/1996 | Sunada et al. | 370/245 |
| 5,850,388 | 12/1998 | Anderson et al. | 370/252 |
| 5,862,335 | 1/1999 | Welch, Jr. et al. | 709/224 |

*Primary Examiner*—Tariq R. Hafiz
*Assistant Examiner*—Tuan Q. Dam
*Attorney, Agent, or Firm*—Oliff & Berridge, PLC

[57] ABSTRACT

A program debugging support device is connected to a first computer and a second computer through a network. A datagram is sent from a client program operating on the first computer to the debugging support device. At this time, the debugging support device stores the datagram from the client program in a storage unit and transfers the datagram to a server program operating on the second computer. The server program processes a datagram from the client program and sends a reply datagram to the debugging support device. The debugging support device transfers a datagram from the server program to the client program and stores the datagram in the storage unit.

8 Claims, 5 Drawing Sheets

PROGRAM DEBUGGING SUPPORT DEVICE

BACKGROUND OF THE INVENTION

The present invention relates to a program debugging support device and more particularly to a device which supports debugging a program in the course of a communication through a network between terminals.

Recently, computer networks such as a LAN (Local Area Network), WAN (Wide Area Network) and internet have developed, so that communications have actively been performed between computers.

Figure 4:
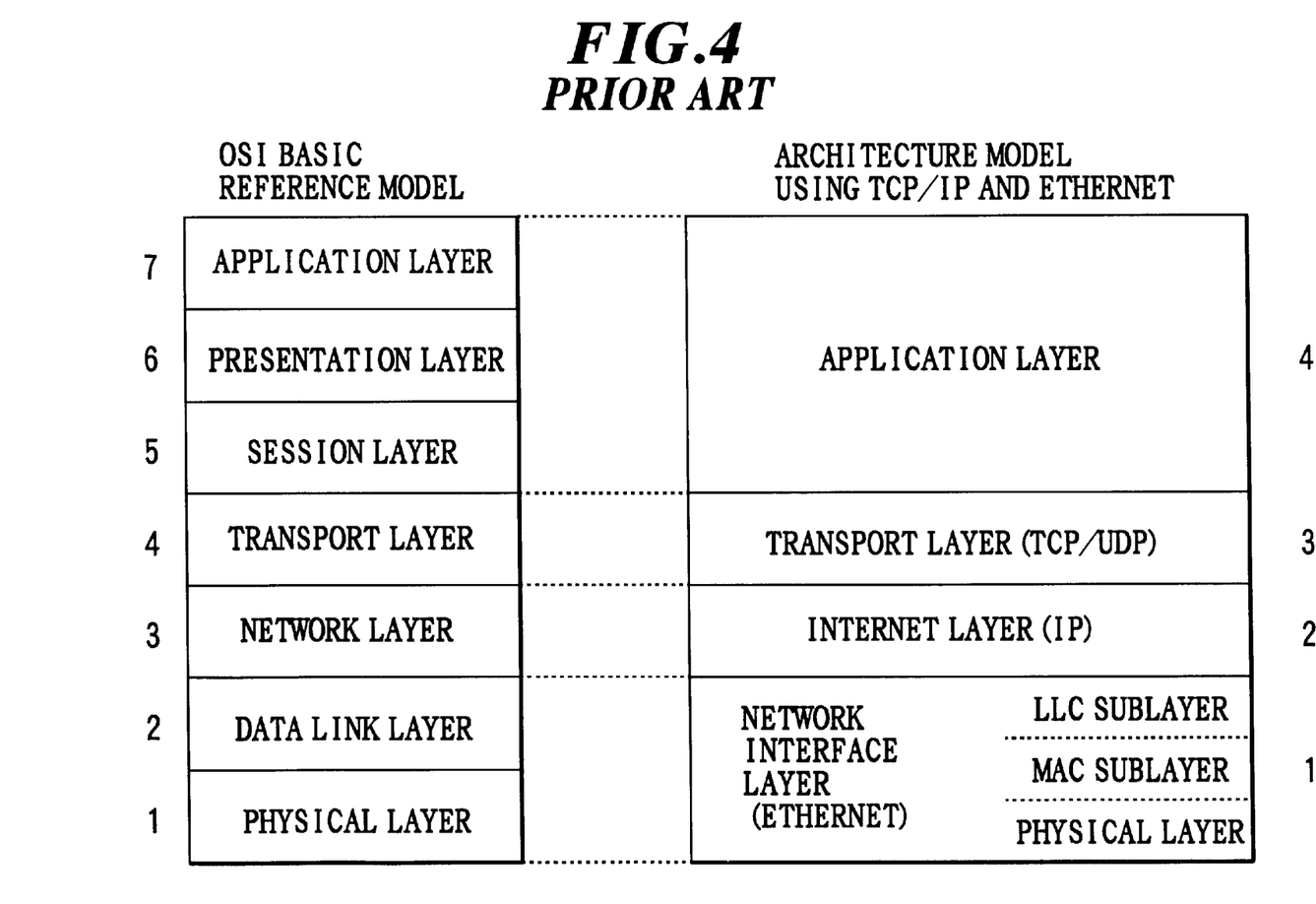
FIG. 4 illustrates a relationship in correspondence between the respective layers of an OSI basic reference model and the respective layers of an architecture model using an TCP/IP and an Ethernet.

Thus, various communication paths have been developed and used. For example, in a LAN, an Ethernet is used frequently as a physical layer/data link layer while a TCP/IP (Transmission Control Protocol/Internet Protocol) layer is used generally as a network layer/transport layer. As shown in FIG. 4, the physical layer, the data link layer, the network layer and the transport layer correspond to lower four layers of an OSI (Open Systems Interconnection) seven-layered model. FIG. 4 shows a relationship in correspondence between the respective layers of the OSI basic reference model and the respective layers of an architecture model using the TCP/IP and Ethernet.

Figure 5:
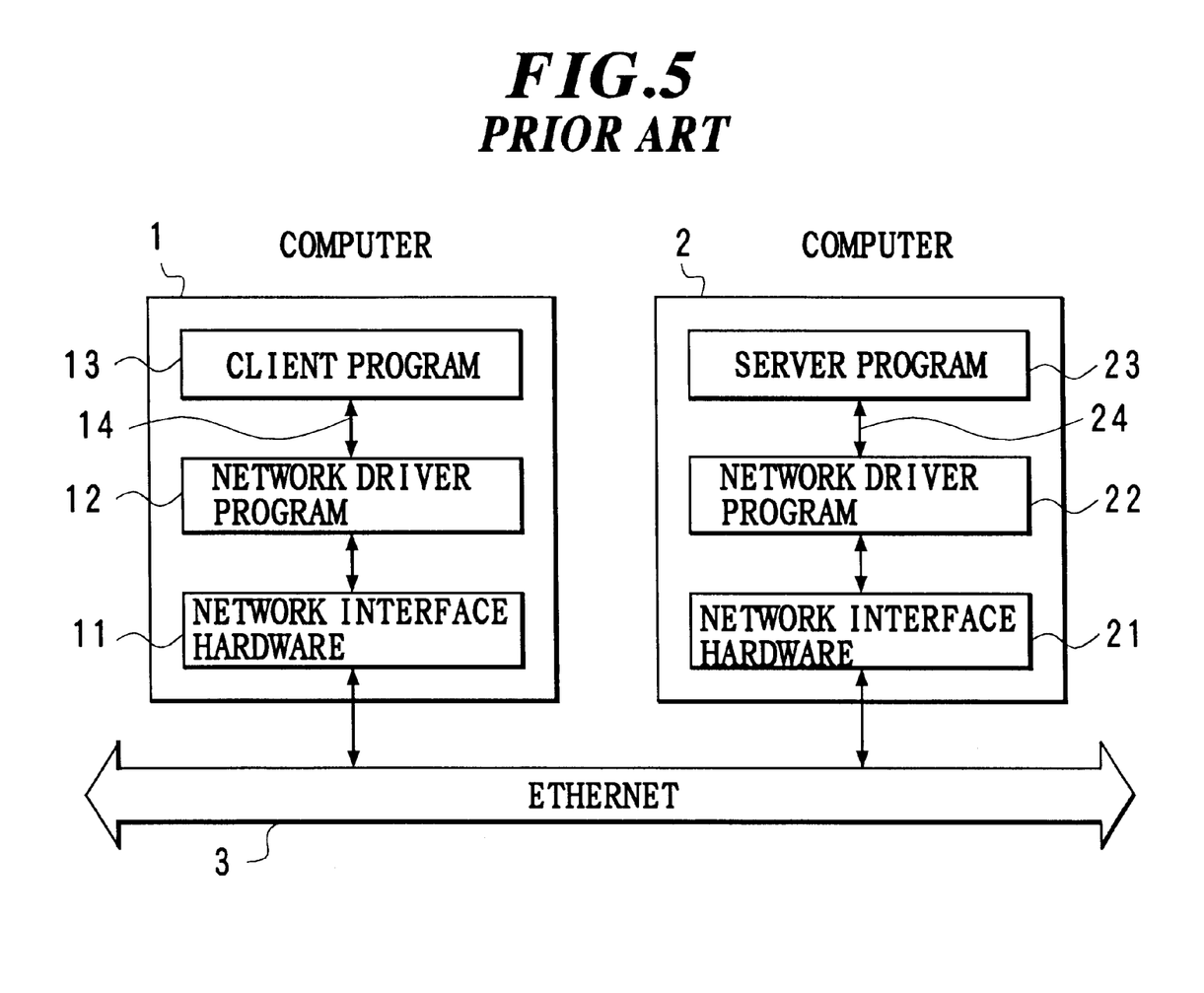
FIG. 5 illustrates conventional client-server communication.

General client-server communication in a network using an Ethernet and TCP/IP will be outlined with reference to FIG. 5, which is a block diagram of a computer network which carries out conventional client-server communication. The computer network of FIG. 5 is provided with a first computer 1 as a client machine, a second computer 2 as a server machine, and an Ethernet 3 which is connected to the computers 1 and 2. The first computer 1 is provided with a network interface hardware 11 which acts as an interface between the computer 1 and the Ethernet 3, a TCP/IP network driver program 12 and a client program 13. The second computer 2 is provided with a network interface hardware 21 which acts as an interface between the computer 2 and the Ethernet 3, a TCP/IP network driver program 22, and a server program 23.

The client program 13 which operates on the first computer 1 requests a port for communication from the TCP/IP network driver program 12 in the computer 1 to obtain a port 14 with a port number X. The port number X is one of port numbers which are unused in the first computer 1.

The client program 13 delivers to the TCP/IP network driver program 12 a port number Y of a port 24 which the IP address server program 23 of the second computer 2 uses, and data to be communicated to the server program 23.

The TCP/IP network driver 12 of the first computer 1 adds an IP address of the first computer 1 itself, the port number X of the client program 13 and a checksum to detect a transmission error to an IP address of the second computer 2, the port number Y of the server program 23 and data to be transmitted to the server program 23, received from the client program 13 to produce a datagram (IP datagram) to a data form stipulated by an IP (Internet Protocol), and sends it through the network interface hardware 11 to the Ethernet 3.

The second computer 2 gets from the Ethernet 3 the datagram for the second computer 2 through network interface hardware 21. The TCP/IP network driver program 22 deletes from the gotten data program the data which includes the IP address of the first computer 1, the port number X of the client program 13 and the checksum, added by the TCP/IP network driver program 12 of the first computer 1 as the sending source, and delivers only required data to the port number Y of the server program 23.

The port number Y of the server program 23 is inherent in the server program 23, which monitors arrival of data from the first computer 1 at the port with the port number Y thereof, and gets the arriving data.

The IP address of the first computer 1 and the port number X of the client program 13 are held within the TCP/IP network driver 22 of the second computer, become destination addresses for which data is sent back, and are referred to in accordance with a request from the server program 23.

The client program 13 has a port number X which changes each time the client program 13 is started up. The server program 23 always has the same port number Y. Communication between the client and the server is performed without fail by specifying those two port numbers of the client program 13 and server program 23 and the IP addresses of the first and second computers.

While in the above the computers as the terminals and the Ethernet TCP/IP as communication means have been taken as an example, devices which carries out client-server communication carries out substantially similar operations.

In the development of client programs and server programs used in such network communication, communication tests and their verification are required in a state where the devices concerned are actually connected to the network and programs actually operate, in addition to a regular developing process of the programs. That is, it is tested and verified whether data was sent and received satisfactorily, or whether the sent/received data was correct or not, etc. If there are some problems, the program used is required to be debugged.

Conventionally, in order to debug a program, a software debugger or a hardware debugger (ICE In-Circuit Emulator) is used. Those debuggers can detect internal operations of the computer, but cannot detect actual data flowing through the Ethernet 3. Thus, for example, a protocol analyzer is used to get data which flows through the network and to refer to it to debug same.

When the protocol analyzer gets data which flows the network, various data flow though the network. Thus, target data is required to be selected.

Recently, multi-task processing has become popular also in a personal computer where more and more increasing tasks are communicated with the same IP address. Thus, even when the received data are selected with an IP address, excess data other than the target data could be gotten in addition to the required data. As a result, useless data could be left.

In this case, in order to get data contained in a program to be debugged, the IP addresses of the first and the second computers 1 and 2, the port number X of the client program 13, and the port number Y of the server program 23 are required.

The IP addresses of the first and second computers 1 and 2 and the port number Y of the server program 23 are fixed whereas the port number X of the client program 13 is dynamically determined each time its program is executed. Therefore, the port number X can not be known beforehand and hence it is difficult to automatically select and get required data alone.

If a special-purpose computer or network can be prepared for debugging purposes, the above problem is unlikely to occur and debugging becomes facilitated. However, to this end, the cost would increase. In addition, problems which can occur when loads are added on the computers and/or network are difficult to occur in the special-purpose debugging environment. Thus, it is desired to debug a program in an environment where the program is used actually.

It is therefore an object of the present invention to provide a program debugging support device which easily and securely extracts and collects only a communication datagram based on a program under debugging from among unsorted massive communication datagrams which flow through a network to thereby support debugging the program.

SUMMARY OF THE INVENTION

The present invention was developed in view of these problems.

An object of the invention is to obtain a program debugging support device which can facilitate debugging the first and second programs. In the program debugging support device of the present invention, a program debugging support device having a network address for data transmission is provided on the network. All communication which a program under debugging carries out is carried out through the debugging support device, and communication records are left in a memory of the debugging support device (or external computer). By fetching and verifying the communication records from the memory, debugging the program is facilitated.

That is, in accordance with one aspect of the present invention, the program debugging support device connected to a first and a second computer through a network, the debugging support device being used when a first program operating on the first computer and a second program operating on the second computer are debugged in the course of communication through the network between the first and second computers, the debugging support device comprises: a storage means; and a means for collecting a datagram transferred between the first program and the second program and for storing the collected datagram in the storage means.

The network includes one, for example, of a LAN such as an Ethernet, a WAN and an internetwork where a plurality of LANs are networked.

The first and second programs are application programs such as, for example, a server program and a client program at an application layer level, and a network driver program such as, for example, the TCP/IP driver program at a network layer/transport layer level. The first and second programs each point to both the application and driver programs when those should be debugged simultaneously.

Thus, according to the inventive program debugging support device, only a target datagram is extracted from data which flows through the network between the first and second computers and the contents of the extracted data are verified to thereby facilitate debugging the first and second programs.

The debugging support device may comprise a storage means which contains two pairs of independent network addresses, one pair for identifying, collecting and transferring the datagram and the other pair for calling the debugging support device. For example, in an architecture model using a TCP/IP and an Ethernet, the two pairs of independent network addressees are two pairs of IP address at an internet layer (network layer) level and MAC address at a network interface layer level such that a first IP address corresponds to a first MAC address while a second IP address corresponds to a second MAC address whereby the two pairs of network addresses are used separately.

Thus, when datagram stored in the storage means of the debugging support device is called, a port number and an address can be used to identify, collect and transfer a target datagram while a second port number and a second address calls the debugging support device. As a result, data can be called from the storage unit of the debugging support device through the network to thereby facilitate reference to a communication datagram.

In accordance with another aspect of the present invention, the debugging support device connected through a network to a first, a second computer and an external computer having a storage unit, the debugging support device being used when a first program operating on the first computer and a second program operating on the second computer are debugged in the course of communication through the network between the first and second computers, the program debugging support device comprises: a storage means which contains two pairs of independent network addresses; a means for identifying and collecting a datagram transferred between the first and second programs on the first and second computers and for transferring the collected datagram to and in the external computer, in accordance with one of the two independence addresses contained in the storage means; and a means for calling the debugging support device in accordance with the other of the two pairs of independent network addresses contained in the storage means.

Thus, this debugging support device extracts only a target datagram from data which flows through the network between the first and the second computers, and the external computers collects the datagram and verifies the contents of the datagram. As a result, debugging the first and second programs is facilitated.

All datagrams flowing between the first and second programs of the first and second computers may be stored and managed by the external computer. Thus, the debugging support device is not required to have a storage unit for storing the datagram to thereby contribute to reduction of the cost thereof.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

DESCRIPTION OF THE PREFERRED EMBODIMENT

An embodiment of the debugging support device for a network communication program according to the present invention will be described in more detail with reference to the accompanying drawings.

Structure:

In the embodiment, a network where an Ethernet is used as a physical layer/data link layer, and a TCP/IP layer is used as a network layer/transport layer will be described as an example.

Figure 1:
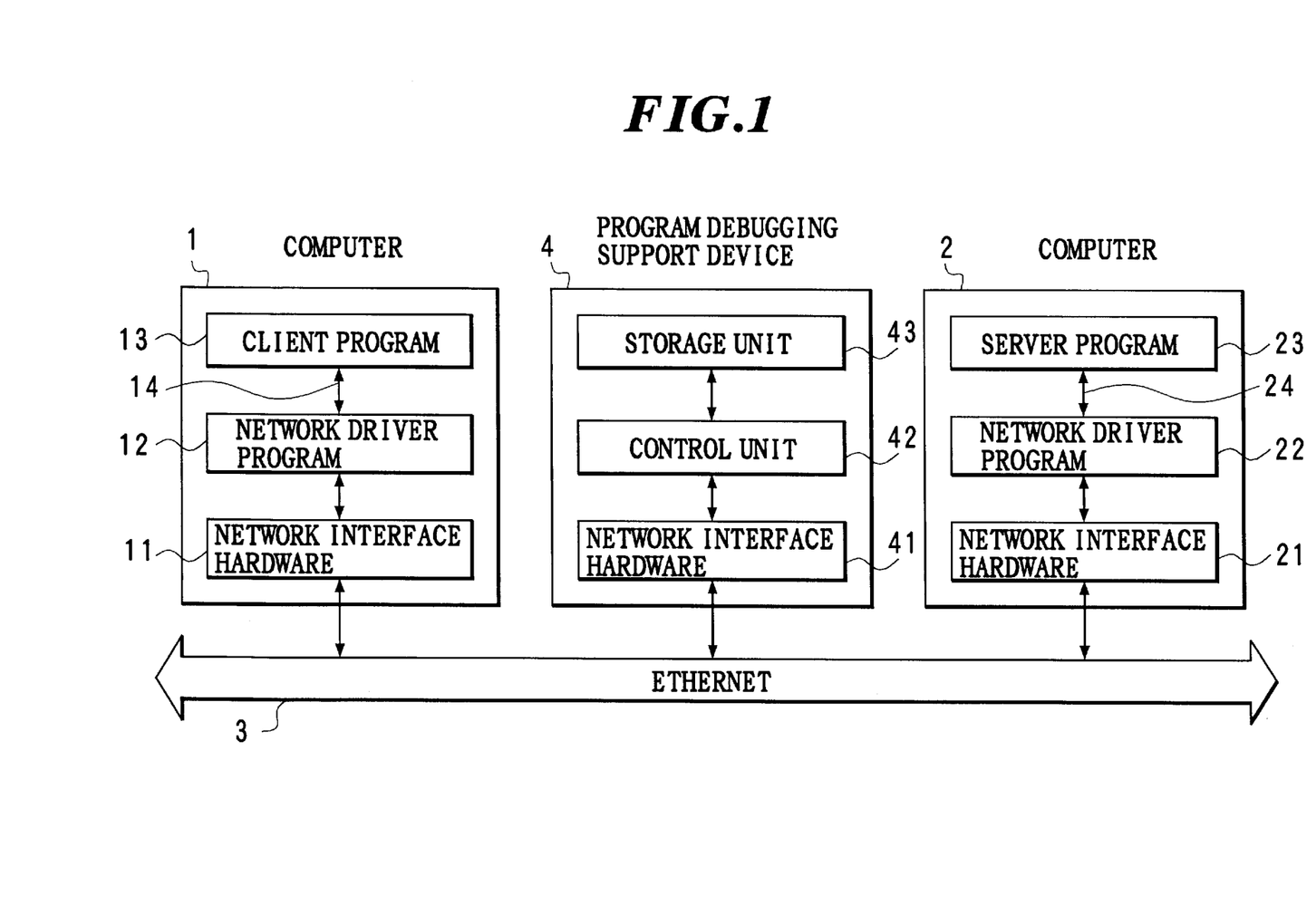
FIG. 1 schematically illustrates a network including a program debugging support device according to the present invention.

Referring to FIG. 1, a first computer 1 as a client machine, a second computer 2 as a server machine, and a program debugging support device 4 are connected through an Ethernet 3 to a computer communication network.

Like the example shown in FIG. 5, the first computer 1 is provided with a network interface hardware 11 which acts as an interface between the computer 1 and the Ethernet 3, a TCP/IP network driver program 12, and a client program 13 as an application program. The second computer 2 is provided with network interface hardware 21 which acts as an interface between the computer and the Ethernet 3, a TCP/IP network driver program 22, and a server program 23 as an application program.

The client program 13 which operates on the first computer requests a port for communication with the TCP/IP network driver program 12 of the computer 1 to obtain a port 14 with a port number X. Data sent to the second computer 2 is sent from the network driver program 22 through a port 24 with a port number Y to the server program 23.

The debugging support device 4 is provided with network interface hardware 41 which acts as an interface between the debugging support device 4 and the Ethernet 3, a control unit 42 and a storage unit 43. The control unit 42 receives a datagram through the network interface hardware 41, sends the data to the storage unit 43 for storing purposes, fetches data from the storage unit 43, and sends the data to the outside through the network interface hardware 41.

Figure 2:
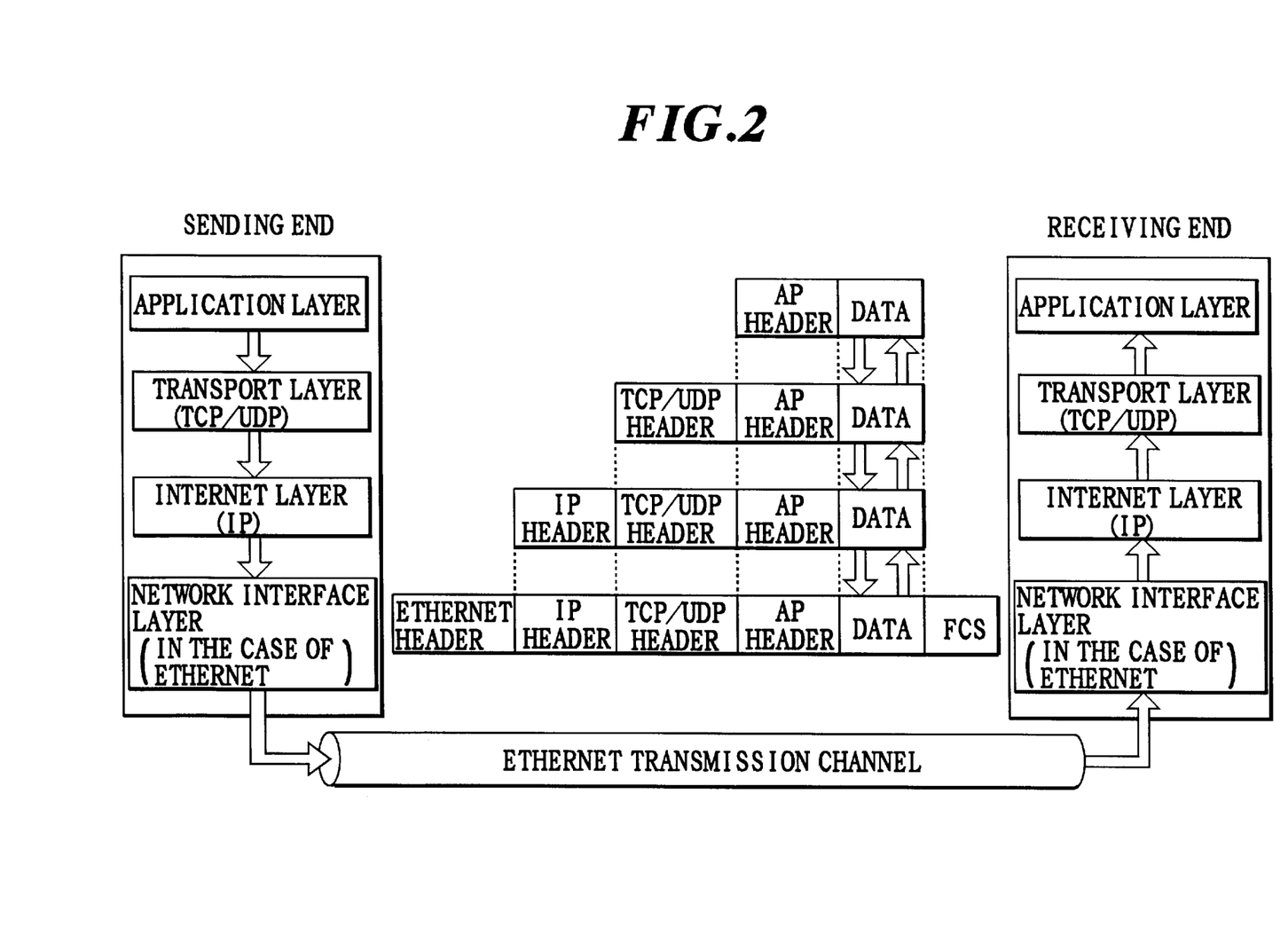
FIG. 2 illustrates data processing performed in the respective data processing layers of the data sending and receiving ends.

Referring to FIG. 2, the relationship in correspondence between the respective internal elements of the first and second computer 1 and 2, and the debugging support device 4 of FIG. 1, and the respective layers of the sending and receiving ends of FIG. 2 are as follows. Both the application layers of FIG. 2 correspond to application programs, that is, the client program 13 and the server program 23, respectively, of FIG. 1. Transport and internet layers of FIG. 2 correspond to the TCP/IP network driver programs 12, 22, respectively, of FIG. 1. Both network interface layers of FIG. 2 correspond to the network interface hardware 11, 21, 41 of FIG. 1.

As shown in FIG. 4, in an OSI seven-layered model, the internet layer corresponds to the network layer, and the network interface layer to the physical layer/data link layer.

Figure 3:
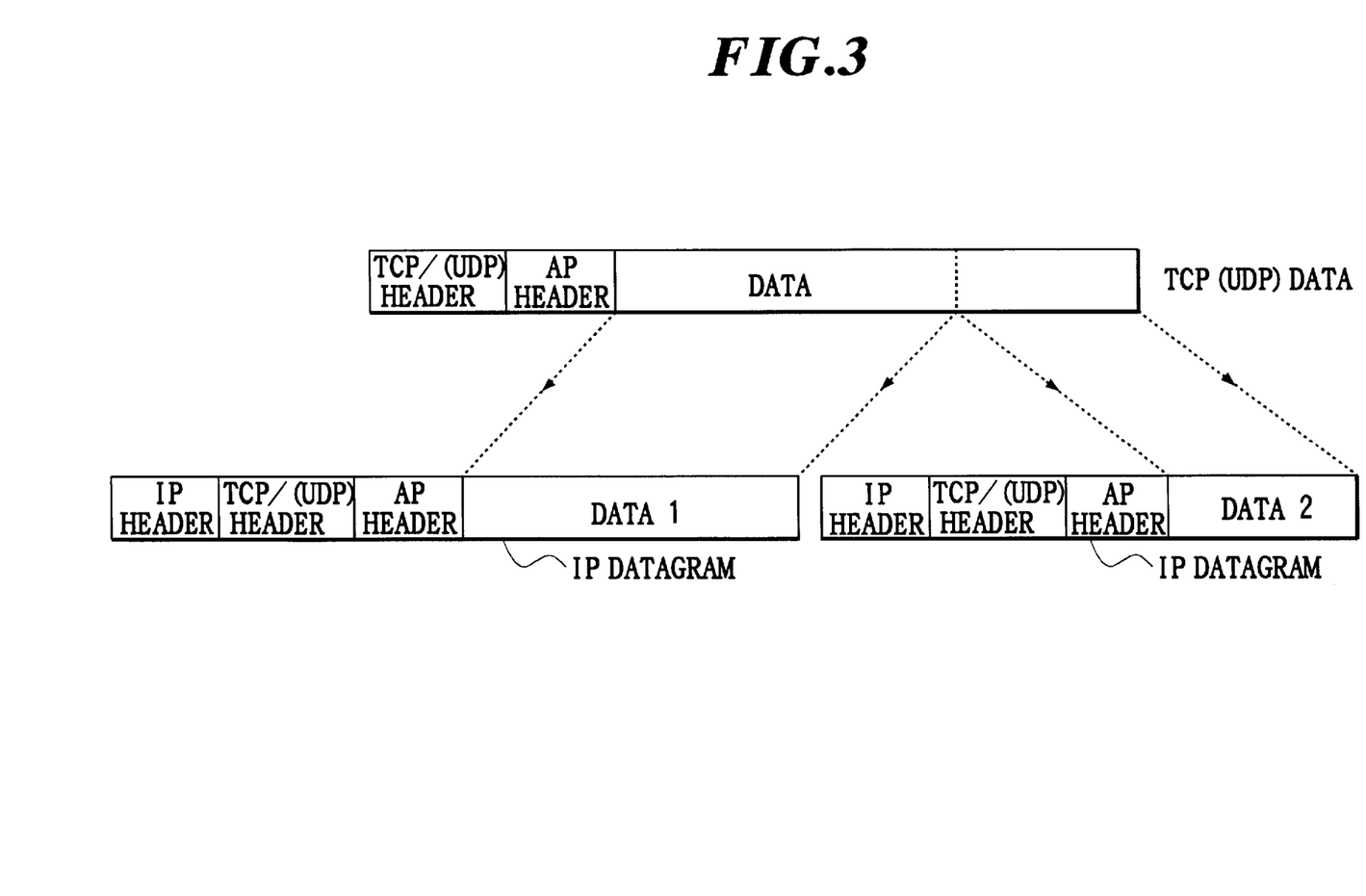
FIG. 3 schematically illustrates IP datagrams produced from TCP data.

Data processing performed in the respective data processing layers will be described next with respect to FIG. 2. First, the application layer of the sending end adds an application header to data, which is then sent to the transport layer of the sending end. Receiving the data, the transport layer adds a TCP or UDP header to the data and sends it as TCP (or UDP) data to the internet layer. As shown in FIG. 3, in the internet layer, data proper is separated from the TCP (or UDP) data. The original header and an IP header are then added to each of the separated data to form a datagram (IP datagram), which is then sent to the network interface layer where an Ethernet header and a frame check sequence (FCS) are added to the datagram. The resulting data is then sent through the Ethernet to the receiving end, which fetches only data proper by performing a process reverse to that performed so far.

At this time, the port number of a port as the interface between the application layer and the transport layer is stored in the TCP header, and IP addresses as source and destination addresses at a network layer level are stored in the IP header.

In the case of the Ethernet, the data link layer which constitutes the network interface layer along with the physical layer is composed of an LLC (Logical Link Control) sublayer and an MAC (Medium Access Control) sublayer (FIG. 4). The MAC sublayer defines a communication function at a link level which is not dependent on the kind of a transmission medium used. In transmission, the MAC subaddress adds a MAC address (source and destination addresses) as addresses at the network interface layer level, and a frame check sequence (FCS) to the data received from the internet layer through the LLC sublayer to form a frame, which is then delivered as a bit string to the physical layer. In receipt, the MAC sublayer performs a process reverse to that performed so far.

Operation:

The debugging support device 4 stores a datagram of the data from the client program 13 on the first computer 1 to the server program 23 on the second computer 2. The debugging support device 4 stores a datagram of data sent back from the server program 23 on the second computer 2 to the client program 13 on the first computer 1.

It is assumed at this time that the program to be debugged is any one (or all) of the network driver program 12 of the first computer, the network driver program 22 of the second computer, the client program 13 and the server program 23. The debugging support device should beforehand store the IP address of the second computer 2.

First, the data to be sent from the client program 13 on the first computer 1 to the server program 23 on the second computer 2 is not sent to the IP address and the port number Y of the second computer 2, but to the IP address of the debugging support device 4 and the port number Y of the second computer 2. That is, the IP address of the debugging support device 4 is handled as the IP address of the second computer 2, when viewed from the client program 13.

Thus, data is sent as a datagram from the client program 13 of the first computer 1 through the Ethernet 3 to the debugging support device 4. The datagram sent to the debugging support device 4 is received by the control unit 42 through the network interface hardware 41 and stored in the storage unit 43 of the control unit 42, and the datagram received by the control unit 42 is transferred through the Ethernet 3 to the second computer 2. At this time, the IP address of the sensing source is used as the IP address of the debugging support device 4, and the port number X of the first computer 1 is transferred as the port number of the sending source.

The data from the client program 13 which is a part of the datagram sent to the second computer 2 is processed by the server program 23. Since the second computer 2 has received the datagram through the debugging support device 4, the second computer 2 detects that the address of the sending source is that of the debugging support device 4, and that the port number of the sensing source is the port number X of the client program 13.

Thus, when the second computer 2 sends reply data to the first computer 1, the reply data from the server program 23 of the second computer 2 is sent as a reply datagram automatically to the IP address of the debugging support device 4 and the port with the port number X of the client program 13. In the debugging support device 4, the control unit 42 receives the reply datagram through the network interface hardware 41, stores the replay datagram in the storage unit 43 and transfers it to the first computer 1. At this time, the port number Y of the second computer 2 as it is transferred as the port number of the sensing source.

The first computer 1 receives the datagram from the debugging support device 4 and the client program 13 processes the datagram.

As described above, only the communication datagram between the client and the server can be collected in the storage unit 43 without touching up the client program 13 and the server program 23 which operate on the first and second computers 1 and 2, respectively.

At this time, if the data stored in the storage unit 43 are callable through the Ethernet 3, reference to the communication datagram is facilitated. However, the port number of the debugging support device 4 required for calling the stored data cannot be determined beforehand. The reason for this is as follows: Port numbers which are identical to the respective port numbers X and Y are required to be used as an intermediary for the datagrams flowing between the first and second computers 1 and 2, and the port number X is dynamically changed depending on the operation of the client program 13 although the port number Y is fixed beforehand. Thus, the port number of the debugging support device 4 is required to be changed depending on the dynamic change of the port number X, and previous creation of a port number which is used to call the stored data but not available for transfer of the datagram may render collection of the datagrams impossible.

In order to avoid this undesirable situation, the debugging support device 4 has two pairs of MAC address which is a physical data transmission network address (network interface layer level address) of the network interface hardware 41 and IP address which is a logical address (network layer level address) inherent in the IP network, wherein one pair of addresses is used to transfer/collect communication datagrams between the first and second computers 1 and 2 while the other pair of addresses is used to call the data stored in the storage unit 43 and to set/manage the debugging support device 4 to thereby permit to call the data stored in the storage unit 43 without influencing the data collecting function.

In such arrangement, collection of the communication datagrams and reference to the collected datagrams can be provided without any interference to each other. Thus, the debugging support device collects communication datagrams between the first and second computers 1 and 2 and sends the collected communication datagrams as they are to an external computer (not shown) which is connected to the Ethernet 3. Thus, the external computer stores and manages the data collected by the external computer. Thus, the debugging support device 4 is not required to have a storage unit such as 43. Thus, the cost of the debugging support device 4 is reduced.

As described above, in the debugging support device of this embodiment, the storage unit is provided in the debugging support device (or external computer) so that only communication which a program under debugging performs is all performed through the debugging support device, communication records are left in the storage unit, and by fetching and verifying the communication records, the program is easily debugged.

While the embodiment has been described with reference to the network using the Ethernet and TCP/IP layer, the present invention is applicable to networks having other compositions.

According to the program debugging support device of the present invention, only a target datagram is extracted from data which flows through the network between the first and second computers and the contents of the extracted data are verified to thereby facilitate debugging the first and second programs.

What is claimed is:

1. a program debugging support device connected to a first computer and a second computer through a network, the debugging support device being used when a first program operating on the first computer and a second program operating on the second computer are debugged in the course of communication through the network between the first and second computers, the debugging support device comprising:

a storage means; and a control means, having a port number identical to a port number of the second program on the second computer, which receives a first datagram transferred from the first program on the first computer, identifies a port number of the first program, collects and stores the first datagram in the storage means, sends the first datagram to the port number of the second program, receives a second datagram transferred from the second program, collects and stores the second datagram in the storage means, and transfers the second datagram to the identified port number of the first program.

2. The debugging support device according to claim 1, comprising a storage means which contains two pairs of independent network addresses, one pair for identifying, collecting and transferring the datagram between the first and second programs on the first and second computers, and the other pair for calling the debugging support device.

3. The debugging support device according to claim 2, wherein each pair of independent network addresses comprises an internet protocol address and a medium access control address.

4. A debugging support device connected through a network to a first computer, a second computer and an external computer having a storage unit, the debugging support device being used when a first program operating on the first computer and a second program operating on the second computer are debugged in the course of communication through the network between the first and second computers, the program debugging support device comprising:

a storage means which contains two pairs of independent network addresses; and a control means, having a port number identical to a port number of the second program on the second computer, which receives a first datagram transferred from the first program on the first computer, identifies a port number of the first program, sends the first datagram to the port number of the second program, transfers and stores the first datagram to and in the external computer, receives a second datagram transferred from the second program, transfers the second datagram to the identified port number of the first program, and transfers and stores the second datagram to and in the external computer.

5. The debugging support device according to claim 4, wherein each pair of independent network addresses comprises an internet protocol address and a medium access control address.

6. The debugging support device according to claim 4, wherein all datagrams flowing between the first and second programs of the first and second computers are stored in the external computer.

7. The debugging support device according to claim 4, wherein the control means receives and transfers the datagram in accordance with one of the two pairs of independent network addresses contained in the storage means, the device further comprising:

a means for calling the debugging support device in accordance with another of the two pairs of independent network addresses contained in the storage means.

8. A program debugging support device connected to a first computer and a second computer through a network, the debugging support device being used when a first program operating on the first computer and a second program operating on the second computer are debugged in the course of communication through the network between the first and second computers, the debugging support device comprising:

a storage means; and a control means which receives a datagram by a same software interface method as the first program, the datagram transferred from the second program, collects and stores the datagram in the storage means and sends the datagram to the first program.

* * * * *